United States Patent
Yu et al.

(10) Patent No.: US 12,451,839 B2
(45) Date of Patent: Oct. 21, 2025

(54) INVERTER AND ALTERNATING CURRENT FAULT IDENTIFICATION METHOD FOR PHOTOVOLTAIC SYSTEM

(71) Applicant: Sungrow Power Supply Co., Ltd., Hefei (CN)

(72) Inventors: Yanfei Yu, Hefei (CN); Liu Su, Hefei (CN); Fenglei Wu, Hefei (CN); Xiaoxun Li, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 18/560,908

(22) PCT Filed: May 30, 2022

(86) PCT No.: PCT/CN2022/095907
§ 371 (c)(1),
(2) Date: Nov. 14, 2023

(87) PCT Pub. No.: WO2023/000826
PCT Pub. Date: Jan. 26, 2023

(65) Prior Publication Data
US 2024/0258969 A1    Aug. 1, 2024

(30) Foreign Application Priority Data
Jul. 20, 2021  (CN) .......................... 202110819893.2

(51) Int. Cl.
*H02S 50/10*   (2014.01)
*G01R 13/00*   (2006.01)
(Continued)

(52) U.S. Cl.
CPC .............. *H02S 50/10* (2014.12); *G01R 13/00* (2013.01); *H02J 3/0012* (2020.01); *H02J 3/38* (2013.01); *H02J 2300/24* (2020.01)

(58) Field of Classification Search
CPC .. H02J 3/0012; H02J 3/38; H02J 3/381; H02J 2300/24; H02S 50/00; H02S 50/10; G01R 13/00; Y02E 10/56
(Continued)

(56) References Cited

U.S. PATENT DOCUMENTS

| 2010/0106339 A1 | 4/2010 | Davenport Little et al. |
| 2018/0001455 A1 | 1/2018 | Meyer et al. |

(Continued)

FOREIGN PATENT DOCUMENTS

| CN | 102158129 A | 8/2011 |
| CN | 105785174 A | 7/2016 |

(Continued)

OTHER PUBLICATIONS

First Office Action for Japanese Application No. 2023-567943, mailed Nov. 19, 2024.
(Continued)

*Primary Examiner* — Hal Kaplan
(74) *Attorney, Agent, or Firm* — Wolf, Greenfield & Sacks, P.C.

(57) ABSTRACT

An inverter and a method for identifying a fault on an alternating current side of a photovoltaic system are provided. A controller records a waveform of a preset parameter of the photovoltaic system, and then transmits the recorded waveform to an external device. The external device that performs relatively excellently in data storage and processing stores the waveform and performs subsequent processing, to accurately recognize the fault on the alternating current side of the inverter. Further, the fine waveform can be seen from the external device, so that the accuracy of system monitoring is greatly improved. Moreover, the external device analyzes the waveform and generates a control instruction to accurately control the inverter due to advan- (Continued)

tages of storage capacity, big data, and computing power. In addition, system performance can be optimized in cooperation with a local control unit.

19 Claims, 7 Drawing Sheets

(51) Int. Cl.
*H02J 3/00* (2006.01)
*H02J 3/38* (2006.01)
(58) Field of Classification Search
USPC .......................................................... 307/24
See application file for complete search history.

(56) References Cited

U.S. PATENT DOCUMENTS

| | | | |
|---|---|---|---|
| 2018/0145582 A1 | 5/2018 | Shuai et al. | |
| 2020/0256926 A1 | 8/2020 | Umezawa et al. | |

FOREIGN PATENT DOCUMENTS

| | | | |
|---|---|---|---|
| CN | 205509664 U | 8/2016 | |
| CN | 106603003 A | 4/2017 | |
| CN | 110401411 A | 11/2019 | |
| EP | 1 398 687 A2 | 3/2004 | |
| JP | 2001-095263 A | 4/2001 | |
| JP | 2001-314037 A | 11/2001 | |
| JP | 2011-001825 A | 1/2011 | |
| JP | 2011-182519 A | 9/2011 | |
| JP | 2015-104276 A | 6/2015 | |
| JP | 2017-044612 A | 3/2017 | |
| JP | 2018-157708 A | 10/2018 | |
| JP | 2019-118210 A | 7/2019 | |

OTHER PUBLICATIONS

International Search Report and Written Opinion for International Application No. PCT/CN2022/095907, mailed Aug. 17, 2022.
Teng et al. Design of power fault record wave monitoring device based on Zynq7100 SoC chip. Industrial Instruments and Automation Devices. Jun. 1, 20155;3:60-63.
Extended European Search Report for European Application No. 22844993.0, dated Aug. 4, 2025.

Figure 8

INVERTER AND ALTERNATING CURRENT FAULT IDENTIFICATION METHOD FOR PHOTOVOLTAIC SYSTEM

This application is a national stage filing under 35 U.S.C. § 371 of International Patent Application Serial No. PCT/CN2022/095907, filed May 30, 2022, which claims priority to Chinese Patent Application No. 202110819893.2, titled "INVERTER AND METHOD FOR IDENTIFYING FAULT ON ALTERNATING CURRENT SIDE OF PHOTOVOLTAIC SYSTEM", filed on Jul. 20, 2021 with the China National Intellectual Property Administration. The contents of these applications are incorporated herein by reference in their entirety.

FIELD

The present disclosure relates to the technical field of power electronics, and in particular to an inverter and a method for identifying a fault on an alternating current side of a photovoltaic system.

BACKGROUND

An alternating current side of a photovoltaic inverter is generally connected to a power grid. It is vital to recognize an emerging fault based on features of key parameters with the fault, for the photovoltaic inverter to respond appropriately. For example, the fault is determined as an overvoltage fault based on a grid voltage exceeding a voltage limit, or an overcurrent fault based on a current exceeding a current limit.

Therefore, it is essential to provide a solution to accurately recognize a fault on the alternating current side of the photovoltaic inverter.

SUMMARY

An inverter and a method for identifying a fault on an alternating current side of a photovoltaic system are provided according to the present disclosure, to accurately recognize the fault.

The following technical solutions are provided according to embodiments of the present disclosure for the above purpose.

In a first aspect of the present disclosure, a method for identifying a fault on an alternating current side of a photovoltaic system is provided. The method includes: recording a waveform of a preset parameter of the photovoltaic system by a controller of the photovoltaic system, wherein the preset parameter comprises an alternating current parameter of an inverter in the photovoltaic system; transmitting the recorded waveform to an external device by the controller; and displaying the waveform and/or analyzing the waveform by the external device, to recognize the fault.

In an embodiment, the recording the waveform of the preset parameter by the controller includes: determining whether there is a waveform recording triggering signal; and recording the waveform of the preset parameter in response to the waveform recording triggering signal.

In an embodiment, the determining whether there is the waveform recording triggering signal includes: determining whether the waveform recording triggering signal is received; or determining whether the waveform recording triggering signal is generated.

In an embodiment, the waveform recording triggering signal is received from the external device.

In an embodiment, the waveform recording triggering signal is generated by a timing module inside the controller when reaching a set time.

In an embodiment, the waveform recording triggering signal is generated by the controller when recognizing a fault of the inverter.

In an embodiment, the inverter is provided with an alternating current power port connected to an alternating current power grid or an alternating current load. The alternating current parameter includes at least one of alternating voltage, alternating current, and leakage current.

In an embodiment, the preset parameter further includes at least one of direct current voltage, direct current, and direct current power.

In an embodiment, the inverter is grounded, and the preset parameter further includes at least one of common mode voltage to ground and insulation impedance to ground.

In an embodiment, the photovoltaic system is provided with a sensor arranged outside the inverter, and the preset parameter further includes at least one of voltage at a grid-connected point, current at the grid-connected point, voltage at a load-connected point, current at the load-connected point, current through the external device, ambient temperature, and light intensity.

In an embodiment, a rate at which the controller records the waveform of the preset parameter is greater than or equal to twice a feature frequency of the preset parameter; and/or a length of time that the recording continues is greater than or equal to a period of the waveform.

In an embodiment, the analyzing the waveform includes: analyzing the waveform in time domain or frequency domain.

In an embodiment, reference data for the analyzing the waveform includes at least one of: standard waveform data stored in a cloud server, another waveform transmitted by the inverter, waveform data transmitted by the inverter previously, and waveform data transmitted by another inverter.

In an embodiment, the method further includes: transmitting an instruction to the controller based on an analysis by the external device after analyzing the waveform, and controlling the inverter.

In an embodiment, the instruction indicates one of starting, stopping, and regulating an operation parameter.

In an embodiment, the transmitting the recorded waveform is performed at least twice before the displaying the waveform and/or analyzing the waveform.

In an embodiment, the method further includes: transmitting an instruction to the controller by the external device and setting the inverter, before the recording the waveform of the preset parameter.

In an embodiment, the recording the waveform of the preset parameter is repeated after the controlling the inverter.

In an embodiment, the external device is a remote server, a cloud server, or a mobile device.

In a second aspect of the present disclosure, an inverter is further provided. The inverter includes a primary circuit and a controller. A direct current power port of the primary circuit is configured to connect a photovoltaic array in a photovoltaic system directly or indirectly, and an alternating current power port the primary circuit is configured to connect an alternating current power grid or an alternating current load. The primary circuit is configured to be controlled by the controller. The controller is configured to communicatively connect an external device, and is configured to perform the method in the first aspect.

In an embodiment, the controller is further configured to control the inverter in response to an instruction transmitted by the external device.

In an embodiment, the controller is configured to communicate with the external device in a wired manner, wirelessly, or through power line carrier.

In an embodiment, the primary circuit is a DC to AC conversion circuit. Alternatively, the primary circuit comprises a DC to AC conversion circuit and at least one DC to DC conversion circuit arranged upstream of the DC to AC conversion circuit.

With the method according to the present disclosure, the controller records the waveform of the preset parameter of the photovoltaic system, and then transmits the recorded waveform to the external device. The external device that performs relatively excellently in data storage and processing stores the waveform and performs subsequent processing, to accurately recognize the fault on the alternating current side of the inverter.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below merely show some embodiments of the present disclosure, and those skilled in the art may obtain other drawings according to the provided drawings without any creative effort.

DETAILED DESCRIPTION OF EMBODIMENTS

Technical solutions in embodiments of the present disclosure are described clearly and completely below in conjunction with the drawings of the embodiments of the present disclosure. Apparently, the embodiments described below are only some rather than all the embodiments of the present disclosure. Any other embodiments obtained by those skilled in the art based on the embodiments in the present disclosure without any creative effort fall within the protection scope of the present disclosure.

Terms of "include", "comprise" or any other variants herein are intended to be non-exclusive. Therefore, a process, method, article or device including multiple elements includes not only the elements but also other elements that are not enumerated, or also include elements inherent in the process, method, article or device. Unless expressively limited otherwise, the statement "comprising (including) one . . . " does not exclude the case that other similar elements may exist in the process, method, article or device.

A method for identifying a fault on an alternating current side of a photovoltaic system is provided according to the present disclosure, to improve accuracy of identification based on features of waveforms.

An inverter includes a primary circuit and a controller. A structure of the primary circuit depends on practical application scenarios. The primary circuit may be a DC to AC conversion circuit. Alternatively, the primary circuit may include a DC to AC conversion circuit and at least one DC to DC conversion circuit arranged upstream of the DC to AC conversion circuit. Various parameters acquired by a detection device inside or outside the inverter are transmitted to the controller, so that the controller can monitor the parameters and therefore accurately control the primary circuit.

In addition, the controller communicates with an external device. The external device may be a remote server, a cloud server, a mobile device or the like. Generally, the external device serves as a master and the controller serves as a slave. The external device remotely transmits an instruction to the controller, for the controller to control the inverter to start, to stop, to operate, or the like and to acquire operation parameters of the inverter. The controller may communicate with the external device in a wired manner, for example, as specified in RS485, CAN, Ethernet, and USB. Alternatively, the controller communicates with the external device wirelessly, for example, through WiFi, Bluetooth, Zigbee, Lora, NB-IOT, and optical communication. Alternatively, the controller communicates with the external device through power-line carrier PLC. All the alternatives are within the protection scope of the present disclosure.

Figure 1:
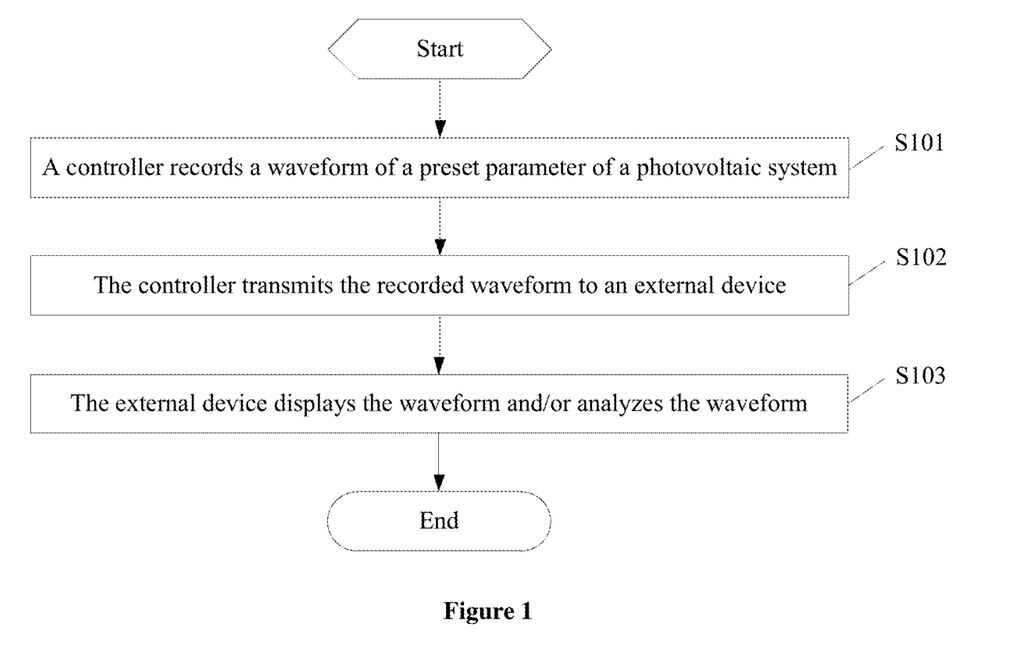
FIG. 1 is a flowchart illustrating a method for identifying a fault on an alternating current side of a photovoltaic system according to an embodiment of the present disclosure.

Referring to FIG. 1, the method includes the following steps S101 to S103.

In step S101, a controller of the photovoltaic system records a waveform of a preset parameter of the photovoltaic system.

Multiple detection devices are usually arranged inside or outside the inverter. The detection devices are configured to sense electrical parameters including voltage, current and power, as well as ambient parameter including temperature and irradiance. The detection devices each output a sensing result to the controller, for the controller to record a waveform of the corresponding parameter.

In practice, the preset parameter includes at least an alternating current parameter of the inverter in the photovoltaic system, for example, at least one of alternating voltage, alternating current, and leakage current. A waveform of the alternating voltage or the alternating current may be recorded for analyzing features of an alternating current power grid or an alternating current load, such as a voltage harmonic, a current harmonic, a direct component of voltage, a direct component of current, active power, reactive power, apparent power, a power factor, impedance, and stability. A waveform of the leakage current may be recorded for monitoring performance of the system in insulation and safety.

Figure 2:
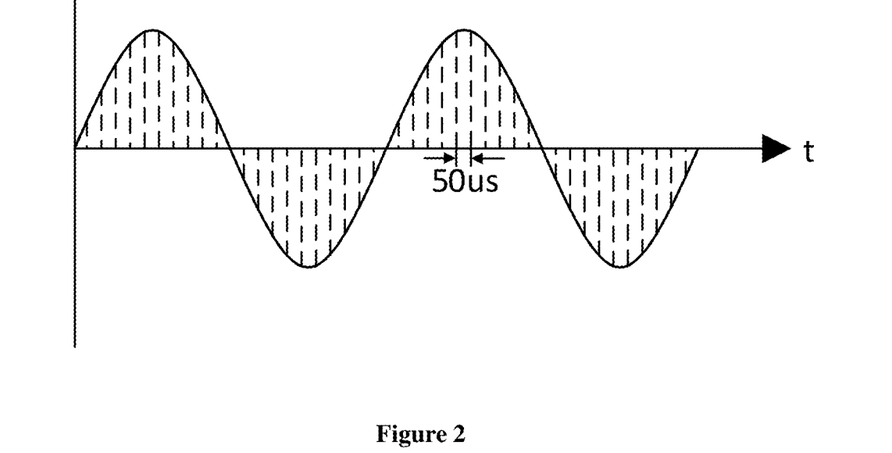
FIG. 2 is a schematic diagram illustrating waveform recording according to an embodiment of the present disclosure.

A rate at which the controller records the waveform and a length of time that the recording lasts depend on practical application scenarios. In practice, the rate is not less than twice a feature frequency of the preset parameter to ensure fidelity of the recorded waveform, following the Shannon's theorem in signal sampling. That is, key information is successfully acquired when the rate is greater than twice the feature frequency. For example, in order to record a waveform of alternating voltage of 50 Hz across an alternating current power port of the inverter, the rate is not less than 100 Hz. That is, no less than 100 values per second are recorded for the voltage. In addition, for a constant rate, a longer length of time corresponds to a greater number of values and thence to better integrity of the waveform. The length of time is preferably not shorter than a period of an original waveform of the preset parameter. For example, for the alternating voltage of 50 Hz with a period of 20 ms across the alternating current power port, the length of time is preferably not less than 20 ms. Multiple successive periods, for example, ten successive periods, are recorded even, for showing periodicity of the waveform. The longer length of time of recording indicates a greater amount of data to be recorded, stored and transmitted, imposing higher requirements on hardware. Therefore, the length of time may be balanced against the hardware in practice. FIG. 2 is a schematic diagram illustrating waveform recording of sinusoidal alternating voltage (for example, the grid voltage) of 50 Hz (with a period of 20 ms). The waveform is recorded at 50 us intervals, and thus 400 values are recorded per period.

In step S102, the controller uploads the recorded waveform to the external device.

The controller uploads the recorded waveform to the external device through corresponding communications depending on practical application scenarios, and all of which are within the protection scope of the present disclosure.

In step S103, the external device displays the waveform and/or analyzes the waveform, to recognize the fault on the alternating current side of the photovoltaic system.

In practice, in addition to recognize the fault based on features of key parameters with the fault, for example, recognize an overvoltage fault based on a grid voltage exceeding a voltage limit or recognize an overcurrent fault based on a current exceeding a current limit, the inverter further proactively monitors features of the alternating-current power grid such as a range, impedance and a harmonic of the grid voltage, and adapt its operation parameters to the features of the alternating current power grid timely.

However, only a local control unit (i.e., the controller) of the inverter identifies the fault and adapts the operation parameters, resulting in limited accuracy of identification due to limited data storage and data processing of the local control unit.

Through step S102 and step S103, the external device identifies the fault. The external device displays the waveform transmitted by the inverter through its own display interface or a display terminal connected to the external device. In this case, the external device functions as a remote oscilloscope. The external device further analyzes the waveform and outputs an analysis.

The external device analyzes the waveform, including analyzing features of the waveform in time domain or frequency domain. The features include a direct current component, amplitude of the waveform, system stability, and the like.

In practice, reference data for analyzing the waveform by the external device includes at least one of standard waveform data stored in a cloud server, another waveform transmitted by the inverter, waveform data transmitted by the inverter previously, and waveform data transmitted by another inverter.

The external device analyzes the waveform by: comparing the present waveform with standard waveform data stored in the external device to obtain an analysis and output the analysis. Alternatively, the external device analyzes the waveform by: comprehensively analyzing the present waveform (for example, a waveform of alternating voltage) and another waveform (for example, a waveform of current) data transmitted by the inverter to obtain an analysis and output the analysis. Alternatively, the external device analyzes the waveform by: comprehensively analyzing the present waveform and the waveform data transmitted by the inverter previously to obtain an analysis and output the analysis. Alternatively, the external device analyzes the waveform by: comprehensively analyzing the present waveform and the waveform data transmitted by another inverter to obtain an analysis and output the analysis result.

In the method according to the embodiments, the external device that performs relatively excellently in data storage and processing stores the waveform and performs subsequent processing, to accurately recognize the fault on the alternating current side of the inverter.

Figure 3:
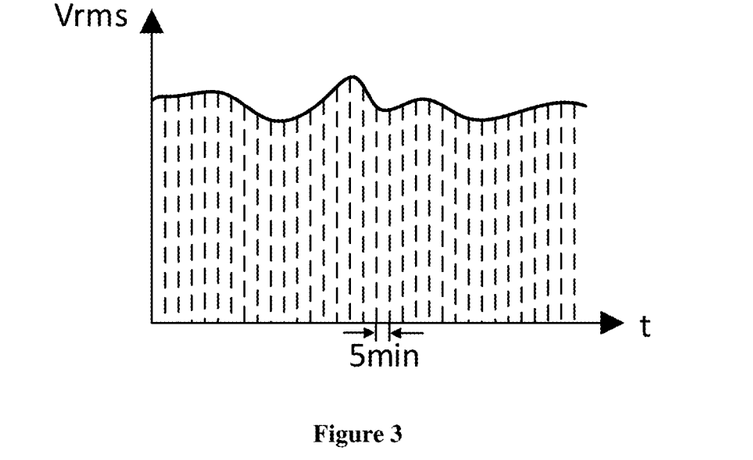
FIG. 3 is a schematic diagram illustrating data monitoring by a conventional system according to an embodiment of the present disclosure.

It should be noted that the waveform recording described in the embodiments is different from data monitoring by a conventional system, which is usually performed at minute level. As shown in FIG. 3, the alternating voltage is usually monitored at minute level, and only a waveform of a root mean square voltage Vrms instead of the real-time waveform of the voltage is displayed. In the embodiments, the waveform is recorded finely for the external device to finely analyze the waveform and display the waveform subsequently, greatly improves precision of the monitoring.

Figure 4:
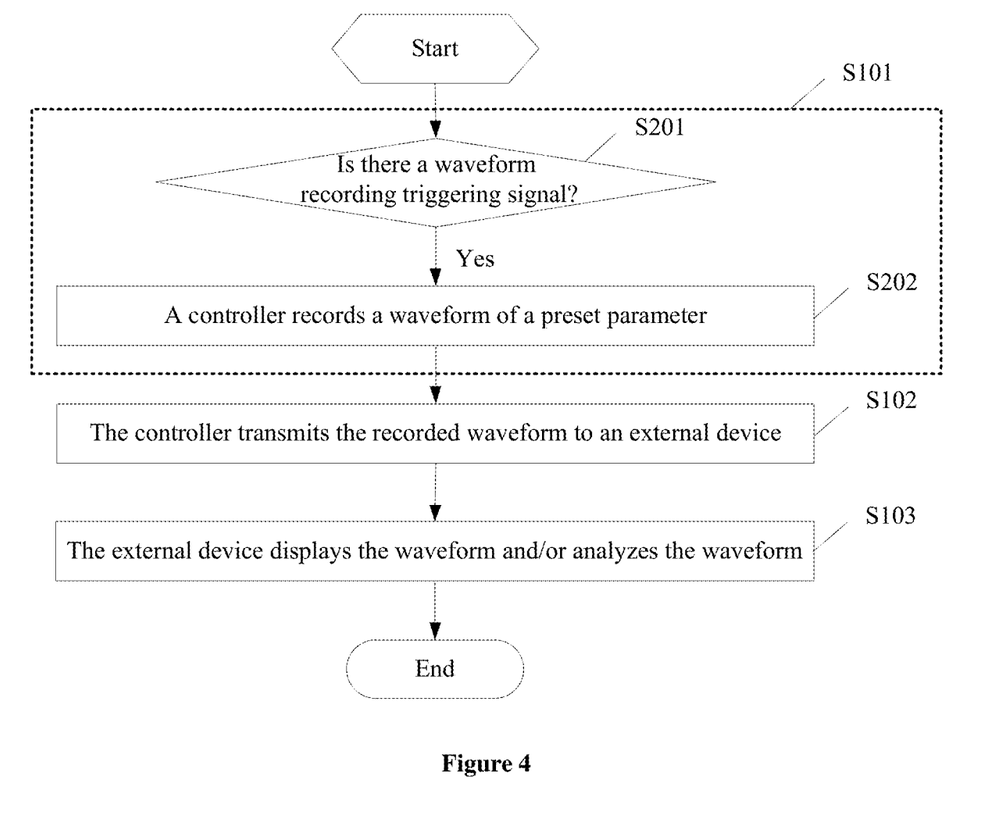
FIG. 4, FIG. 5, FIG. 6, and FIG. 7 are flowcharts each illustrating the method for identifying the fault on the alternating current side of the photovoltaic system according to an embodiment of the present disclosure.

According to another embodiment of the present disclosure, based on FIG. 1, step S101 of the method includes the following steps S201 and S202, as shown in FIG. 4.

In step S201, the controller determines whether there is a waveform-recording triggering signal.

Details are described as follows. The controller determines whether a waveform recording triggering signal is received. Alternatively, the controller determines whether a waveform recording triggering signal is generated. That is, the waveform recording triggering signal may be received by the controller from elsewhere or generated by the controller, depending on practical application scenarios. All the alternatives are within the protection scope of the present disclosure.

In a preferred embodiment, the waveform-recording triggering signal is received by the controller. For example, the waveform recording triggering signal is transmitted to the inverter by an external device, for example, via an operating interface of a remote server/cloud server, an application of a mobile device, or by pressing a button on a mobile device, to trigger the inverter to record the waveform.

In another preferred embodiment, the waveform recording triggering signal is initiated based on a timing mechanism of the inverter. When a timing module inside the controller of the inverter reaches a set time instant, the controller generates the waveform recording triggering signal to trigger the controller to record the waveform. For example, the inverter triggers the waveform recording at one-hour intervals. In this way, the waveform can be recorded in real time without occupying excessive storage and communication channel resources.

In another preferred embodiment, the waveform recording triggering signal is generated when a fault in the inverter is identified. The controller, when recognizing a fault of the inverter, starts recording the waveform. For example, the controller is triggered to record a waveform of the grid voltage in response to an overvoltage fault in the power grid. In this way, the waveform can be accurately recorded constantly in case of fault, without occupying excessive storage and communication channel resources.

Only some examples are described above, and the present disclosure is not limited thereto. Details that the controller determines whether there is a waveform recording triggering signal may vary from practical application scenario to practical application scenario. All the alternatives are within the protection scope of the present disclosure.

In response to the waveform-recording triggering signal, the method proceeds to step S202.

In step S202, the controller records the waveform of the preset parameter.

Details that the controller records the waveform can refer to the previous embodiments, and thus are not repeated here.

Regardless of the structure of the primary circuit, the inverter is generally provided with two power ports in practice, namely, a direct current power port and an alternating current power port. The alternating current power port is connected to an alternating current power grid or an alternating current load. The direct current power port is connected to a photovoltaic array directly or through a DC to DC converter. In addition, a combiner box may be arranged upstream of the direct current side of the inverter, depending on practical application scenarios. All the alternatives are within the protection scope of the present disclosure.

In addition, a sensing device is further arranged in the inverter, to sense an electrical parameter of the corresponding power port. Therefore, the controller of the inverter can record the waveform of the electrical parameter constantly at a high speed through steps of the above method, and transmit the recorded waveform to the external device through communications. The controller of the inverter detects whether there is a waveform recording triggering signal, and records a waveform of at least one of the electrical parameters from the power ports throughout a first period of time in response to the waveform recording triggering signal. For example, the controller records a waveform of the voltage at the alternating current power port immediately when the waveform recording triggering signal is detected.

In practice, in addition to the electrical parameter of the alternating current power port, the preset parameter includes the electrical parameter of the direct current power port, for example, at least one of direct current voltage, direct current, and direct current power. Waveforms of the direct-current voltage and the direct current are constantly recorded for analyzing features, such as direct current power, and stability of the voltage and the current, of a direct-current power supply or direct-current load.

In practice, the inverter is further provided with a ground terminal. In this case, the preset parameter is an electrical parameter to ground, including at least one of common mode voltage to ground and insulation impedance to ground. Waveforms of the common mode voltage to ground and the insulation impedance to ground are constantly recorded, for detecting the performance of the system in insulation and safety.

In addition, the inverter is provided with an external sensor. In this case, the preset parameter is an external electrical parameter, including at least one of voltage at a grid-connected point, current at the grid-connected point, voltage at a load-connected point, current at the load-connected point, ambient temperature, and light intensity. In practice, an external current sensor senses the current at the grid-connected point and/or current through the external device. An external temperature sensor senses the ambient temperature, converts the ambient temperature into an electrical parameter signal, and transmits the electrical parameter signal to the controller. An external radiation sensor senses the light intensity, converts the light intensity into an electrical signal, and transmits the electrical signal to the controller. Waveforms of the external electrical parameters are constantly recorded to monitor the external device or ambient conditions.

Only some examples of the preset parameter are described above, and the preset parameter is not limited thereto. Any parameter to be analyzed or displayed is within the protection scope of the present disclosure.

According to another embodiment of the present disclosure, the external device further generates a control instruction after analyzing the waveform, for controlling the inverter to operate. In this case, the external device functions as a remote CPU (central processing unit/processor).

Figure 5:
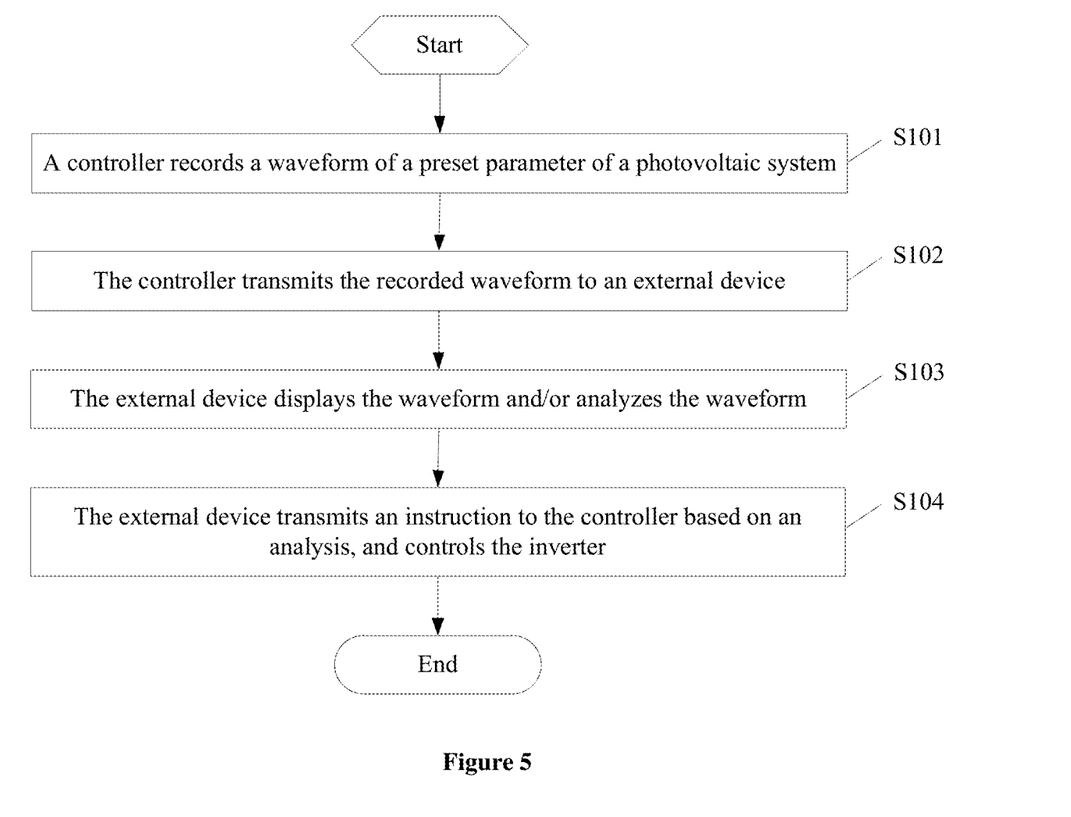

That is, as shown in FIG. 5 (illustrated based on FIG. 1), the method further includes the following step S104 after step S103.

In step S104, the external device transmits an instruction to the controller based on the analysis, to control the inverter.

The instruction indicates one of starting, stopping, and regulating an operation parameter.

The external device further transmits the instruction to the inverter based on a result of analyzing the waveform. For example, in response to an analysis indicating that a harmonic, direct current component or leakage current is relatively large, the external device transmits an instruction to regulate an operation parameter of the inverter, so as to reduce the harmonic, direct current component or leakage current. In response to an analysis indicating that a direct current voltage deviates significantly from a previous maximum power point, the external device transmits an instruction to regulate the operation parameter of the inverter, so that the inverter can track the maximum power point. In response to an analysis indicating that the alternating current power grid is unstable, the external device transmits an instruction to regulate the operation parameter of the inverter, for example, reduce outputted active power or enhance supporting capability of the alternating current power grid by increasing outputted capacitive reactive power, so as to reduce an impact of the inverter on the alternating current power grid. In response to an analysis indicating that there is a potential fault in the system, for example, decreasing insulation to ground, the external device transmits an instruction in advance to regulate the operation parameter of the inverter, to optimize the operation of the system so as to avoid the fault, or switches the system to a protected mode in advance so as to prevent the fault from expanding.

In practice, the operation parameter of the inverter to be regulated includes but is not limited to: a control loop parameter, a duty cycle, target voltage, target current, target power, and the like.

The external device, for example, a remote server or a cloud server is generally provided with large storage capacity, big data, and computing power that the local control unit of the inverter does not have. Therefore, in the method according to the embodiments, the external device, for example, the remote server or cloud server analyzes the waveform to obtain the control instruction, and therefore the control is performed more precisely compared with the local control unit. The remote server or the cloud server interacts with the local control unit relatively slowly, and therefore complements and cooperates with the local control unit of the inverter that can perform the control quickly and timely, thereby greatly improving the system performance.

In addition, the external device, for example, the remote server or cloud server, when regulating the operation mode or the operation parameter of the inverter, may further perform determination based on waveforms recorded in multiple numbers of times, to control the system where the inverter is arranged to operate in an optimal mode. For example, the external device performs comprehensive determination based on waveforms recorded and transmitted by the inverter in the morning, the noon, and the evening, to obtain a relatively appropriate operation mode or operation parameter. Alternatively, the operation state or operation parameter is adapted to time, so that the inverter can operate at an optimal operation mode all the time. That is, step S101 and step S102 may be performed multiple times before step S103. In this case, the flowchart of the method is as shown in FIG. 6.

The external device, for example, the remote server or cloud server, also proactively transmits the instruction to regulate the operation mode or the operation parameter of the inverter before controlling the inverter to record the waveform and transmit the recorded waveform. The external device, for example, the remote server or cloud server analyzes the waveform to obtain an optimal operation mode or operation parameter. For example, for a grid-connected inverter, the cloud server first transmits an instruction to control the inverter to operate in a mode of low output power, to record a waveform of an output voltage and to transmit the recorded waveform. Then, the cloud server transmits an instruction to control the inverter to operate in a mode of high output power, to record the waveform of the output voltage and to transmit the recorded waveform. The cloud server compares the former waveform of the output voltage and the later waveform of the output voltage to determine strength of the power grid connected to the inverter, and then calculates the operation parameter most appropriate to stability of the inverter and the system, for example, setting to an appropriate proportional integral control parameter, increasing or decreasing voltage feed forward control, or increasing or decreasing active or reactive power output. That is, before step S101 is performed, step S100 in which the external device transmits an instruction to the controller to set a mode of the inverter is performed. Moreover, the method returns to step S101 after step S104. Steps S101 to S104 may be performed for multiple times, depending on practical application scenarios. In this case, a flowchart of the method is as shown in FIG. 7.

Figure 6:
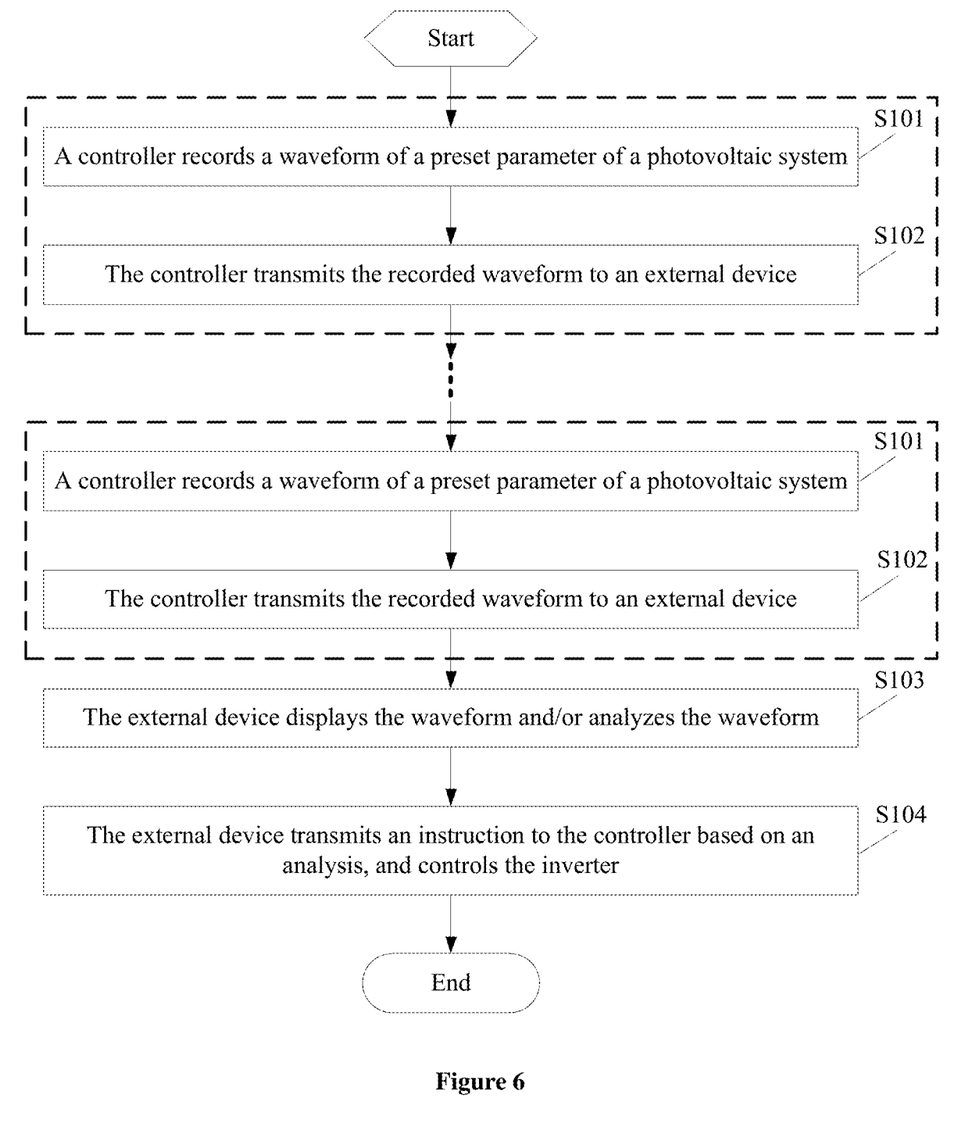
Figure 7:
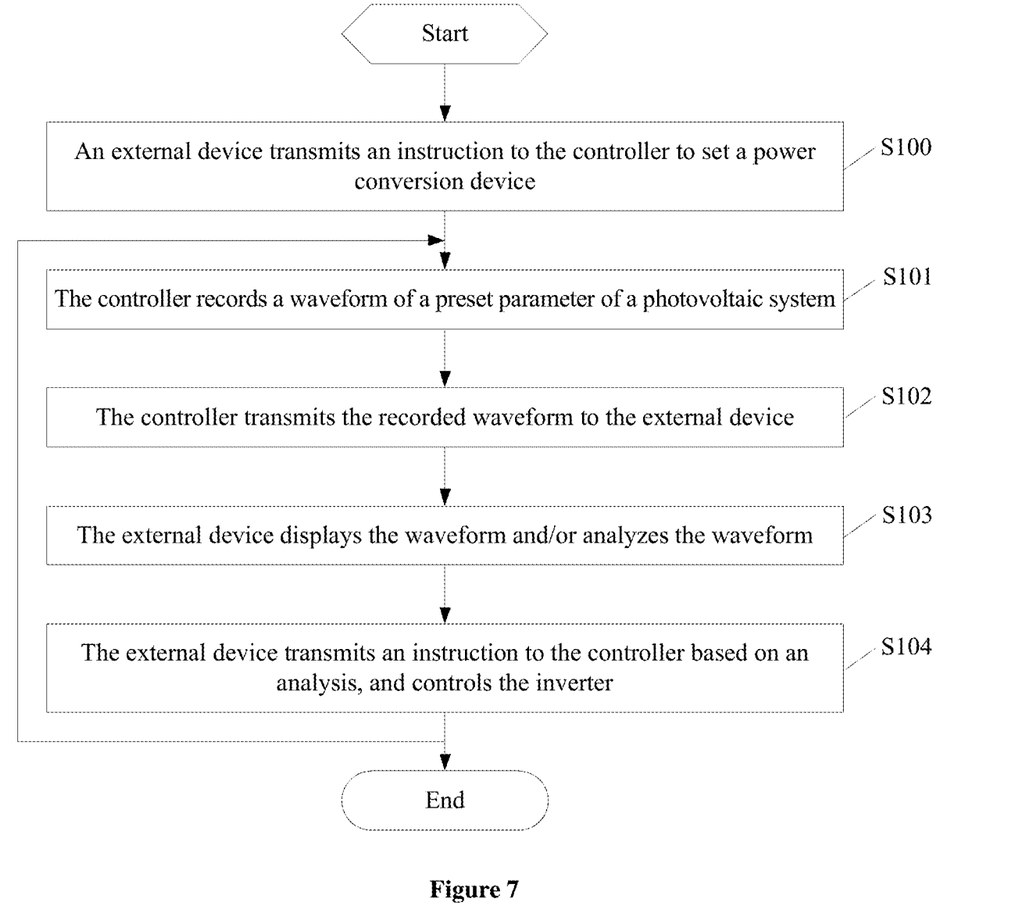

In practice, the solutions as shown in FIG. 6 and FIG. 7 may be combined, depending on practical application scenarios. All alternatives are within the protection scope of the present disclosure.

Figure 8:
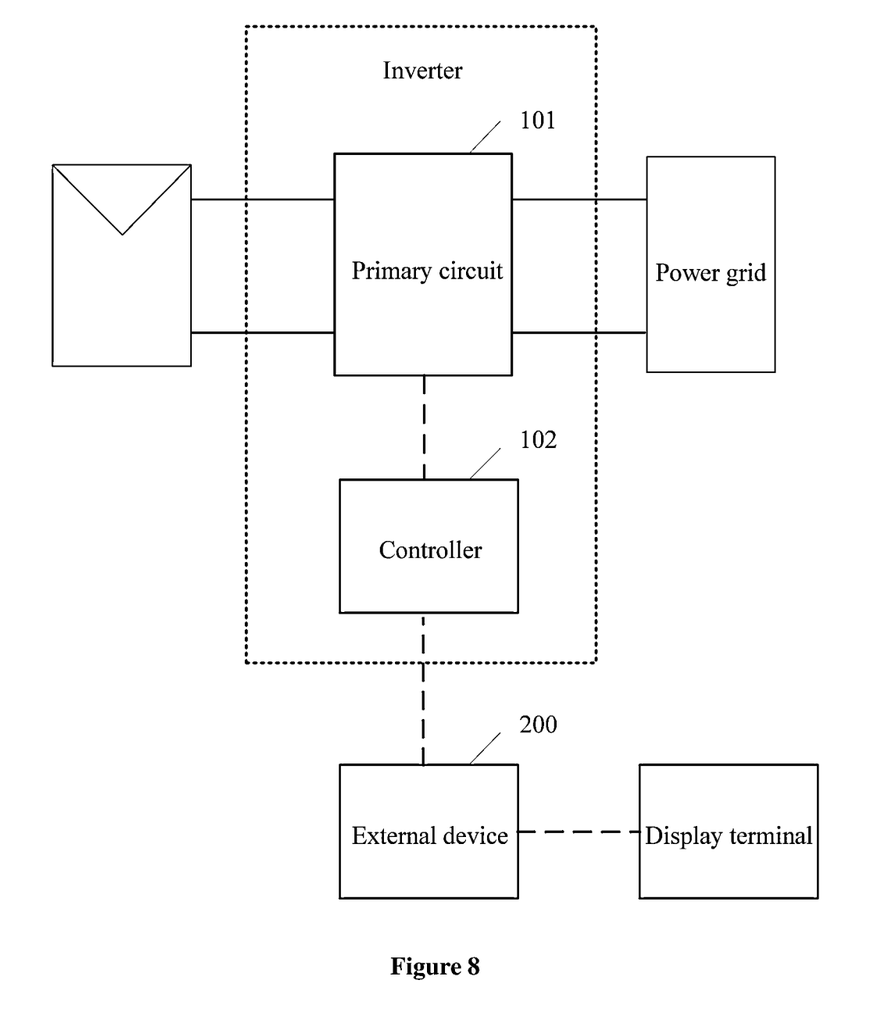
FIG. 8 is a schematic diagram illustrating an application scenario of an inverter according to an embodiment of the present disclosure.

An inverter is further provided according to another embodiment of the present disclosure. Referring to FIG. 8, the inverter includes: a primary circuit 101 and a controller 102.

A direct current power port of the primary circuit 101 is directly or indirectly connected to a photovoltaic array of the photovoltaic system. An alternating current power port of the primary circuit 101 is connected to an alternating current power grid or alternating current load.

The primary circuit 101 is controlled by the controller 102.

The controller 102 is communicatively connected to an external device 200 and is configured to perform steps S101 and S102 of the method described in the above embodiments. Details about the method can refer to the above embodiments, and thus are not repeated here.

The external device 200 displays a waveform transmitted by the inverter through its display interface or a display terminal connected to the external device 200.

Preferably, the controller 102 is further configured to control the inverter in response to an instruction transmitted by the external device.

In practice, the controller 102 communicates with the external device in a wired manner, wirelessly, or through power-line carrier.

In addition, the primary circuit 101 may include only a DC to AC conversion circuit. Alternatively, the primary circuit 101 includes a DC to AC conversion circuit, and at least one DC to DC conversion circuit arranged upstream of the DC to AC conversion circuit.

Other structures and settings of the inverter may refer to the conventional technology, and are within the protection scope of the present disclosure as long as the inverter can cooperate with the external device 200 to perform the above method.

The embodiments in this specification are described progressively, the same and similar parts between embodiments may be referred to each other, and each embodiment focuses on the differences from other embodiments. Since the system and embodiments of the system are substantially similar to embodiments of the method, the description thereof is relatively simple. For relevant matters, reference may be made to the description of the embodiments of the method. The system and the embodiments of the system are only illustrative. Units described as discrete components may or may not be physically separated. Components shown as units may or may not be physical units, that is, the components may be located in one place or may be distributed among multiple network units. Some or all modules thereof may be selected to implement the solutions in the embodiments where necessary. Those skilled in the art can understand and implement the present disclosure without any creative effort.

Those skilled in the art should further understand that units and algorithm steps described in combination with the disclosed embodiments may be implemented by electronic hardware, computer software or a combination thereof. In order to clearly describe interchangeability of the hardware and the software, steps and elements in the embodiments are described above according to functions. Whether these functions are performed in hardware or software depends on the specific application and design constraints for the technical solution. Those skilled in the art can implement the described functions for a particular application in various manners without departing from the scope of the present disclosure.

Based on the above description of the disclosed embodiments, features described in the embodiments may be replaced or combined so that those skilled in the art can implement or use the present disclosure. Various modifications to the embodiments are apparent to those skilled in the art, and the general principle herein can be implemented in other embodiments without departing from the spirit or scope of the present disclosure. Therefore, the present disclosure should fall within the widest scope in accordance to the principle and the novel features disclosed herein instead of being limited to the embodiments disclosed herein.

The invention claimed is:

1. A method for identifying a fault on an alternating current side of a photovoltaic system, comprising:
recording a waveform of a preset parameter of the photovoltaic system by a controller of the photovoltaic system, wherein the preset parameter comprises an alternating current parameter of an inverter in the photovoltaic system;

transmitting the recorded waveform to an external device by the controller; and at least one of:
  displaying the waveform, by the external device; or
  obtaining, by the external device, a temporal-domain parameter or a frequency domain parameter of the waveform through analysis.

2. The method according to claim 1, wherein the recording is performed in response to detecting a waveform recording triggering signal.

3. The method according to claim 2, wherein the waveform recording triggering signal is received from the external device; or the waveform recording triggering signal is generated by a timing module inside the controller when reaching a set time or by the controller when recognizing a fault of the inverter.

4. The method according to claim 1, wherein the inverter is provided with an alternating current power port connected to an alternating current power grid or an alternating current load, and the alternating current parameter comprises at least one of alternating voltage, alternating current, and leakage current.

5. The method according to claim 1, wherein the preset parameter further comprises at least one of direct current voltage, direct current, and direct current power.

6. The method according to claim 1, wherein the inverter is grounded, and the preset parameter further comprises at least one of common mode voltage to ground and insulation impedance to ground.

7. The method according to claim 1, wherein the photovoltaic system is provided with a sensor arranged outside the inverter, and the preset parameter further comprises at least one of voltage at a grid-connected point, current at the grid-connected point, voltage at a load-connected point, current at the load-connected point, current through the external device, ambient temperature, and light intensity.

8. The method according to claim 1, wherein a rate at which the controller records the waveform of the preset parameter is greater than or equal to twice a feature frequency of the preset parameter; and/or a length of time that the recording continues is greater than or equal to a period of the waveform.

9. The method according to claim 1, wherein when the method comprises obtaining, by the external device, the temporal-domain parameter or the frequency domain parameter of the waveform through the analysis, reference data for the analyzing the waveform comprises at least one of: standard waveform data stored in a cloud server, another waveform transmitted by the inverter, waveform data transmitted by the inverter previously, and waveform data transmitted by another inverter.

10. The method according to claim 1, wherein when the method comprises obtaining, by the external device, the temporal-domain parameter or the frequency domain parameter of the waveform through the analysis, the method further comprises:

transmitting an instruction to the controller based on an analysis by the external device after obtaining the temporal-domain parameter or the frequency domain parameter, and controlling the inverter.

11. The method according to claim 10, wherein the instruction indicates one of starting, stopping, and regulating an operation parameter.

12. The method according to claim 1, wherein the transmitting the recorded waveform is performed at least twice before the at least one of displaying the waveform or obtaining the temporal-domain parameter or the frequency domain parameter.

13. The method according to claim 10, further comprising:

transmitting an instruction to the controller by the external device and setting the inverter, before the recording the waveform of the preset parameter.

14. The method according to claim 13, wherein the recording the waveform of the preset parameter is repeated after the controlling the inverter.

15. The method according to claim 1, wherein the external device is a remote server, a cloud server, or a mobile device.

16. An inverter, comprising:
a primary circuit; and
a controller, wherein
a direct current power port of the primary circuit is configured to connect to a photovoltaic array in a photovoltaic system directly or indirectly, and an alternating current power port of the primary circuit is configured to connect an alternating current power grid or an alternating current load;
the primary circuit is configured to be controlled by the controller; and
the controller is configured to communicatively connect to an external device, and is configured to perform the method according to claim 1.

17. The inverter according to claim 16, wherein the controller is further configured to control the inverter in response to an instruction transmitted by the external device.

18. The inverter according to claim 16, wherein the controller is configured to communicate with the external device in a wired manner, wirelessly, or through power line carrier.

19. The inverter according to claim 16, wherein the primary circuit is a direct current (DC) to alternating current (AC) conversion circuit; or the primary circuit comprises a DC to AC conversion circuit and at least one DC to DC conversion circuit arranged upstream of the DC to AC conversion circuit.

* * * * *